(12) United States Patent
Carter

(10) Patent No.: US 12,294,403 B2
(45) Date of Patent: May 6, 2025

(54) DUAL PHONE CASE

(71) Applicant: Andre Carter, Smithville, TX (US)

(72) Inventor: Andre Carter, Smithville, TX (US)

( * ) Notice: Subject to any disclaimer, the term of this patent is extended or adjusted under 35 U.S.C. 154(b) by 309 days.

(21) Appl. No.: 17/830,034

(22) Filed: Jun. 1, 2022

(65) Prior Publication Data

US 2023/0396281 A1    Dec. 7, 2023

(51) Int. Cl.
*H04B 1/3888* (2015.01)

(52) U.S. Cl.
CPC ................................. *H04B 1/3888* (2013.01)

(58) Field of Classification Search
CPC .................................................... H04B 1/3888
See application file for complete search history.

(56) References Cited

U.S. PATENT DOCUMENTS 9,924,782 B1 *    3/2018   Burke ...................... A45F 5/10

* cited by examiner

*Primary Examiner* — Joseph E Dean, Jr.
(74) *Attorney, Agent, or Firm* — Lyman Moulton, Esq.; Moulton Patents, PLLC

(57) ABSTRACT

The dual phone case (w/wo holster) is the only product of its kind that comes with an optional holster that can be easily added or removed, based on user preference. This unprecedented product is uniquely designed to offer the same amount of protection against damage to both cellular devices and is carefully crafted with a rotating connector, and durable, high-quality materials to ensure long-term sustainability and utility.

6 Claims, 6 Drawing Sheets

DUAL PHONE CASE

BACKGROUND

Many professionals and individuals around the globe have two phones that serve varying needs regarding managing contacts, data, and accessibility. Carrying two separate devices, however, can be incredibly inconvenient considering individuals will often have to constantly dig through their pockets or purses trying to find a particular phone. There have been no products available as original equipment or as an aftermarket to address this problem.

An apparatus to assist in carrying and managing two cellular mobile devices is not being met by any known device or system at present. There have been no products available as original equipment or as an aftermarket to address this problem either.

SUMMARY OF THE INVENTION

The main purpose of dual phone case is to provide users with a cell phone case that can hold two cellular devices safely within one accessory.

A phone case comprising a first cell phone cover and a second cell phone cover configured to receive respective two cell phones on a back side of each. The disclosure also includes a connector attached to a lateral side of each of the respective two cell phones via the first and the second cell phone covers.

Figure 1:
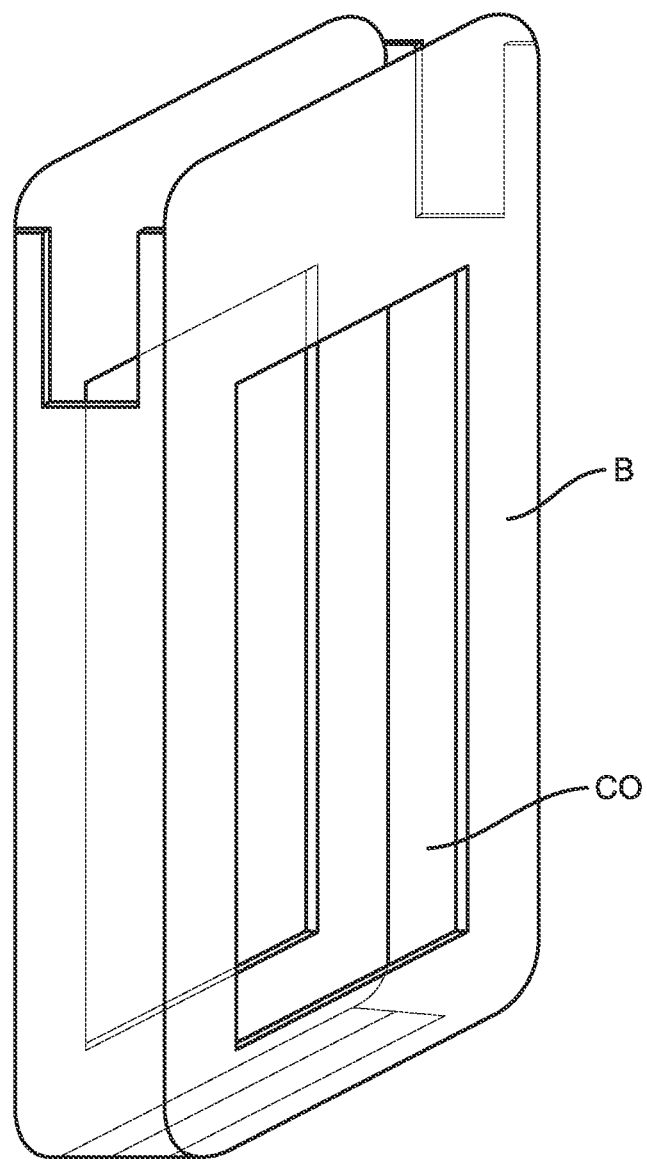
FIG. 1 is a top perspective view of the dual phone case sleeve in accordance with an embodiment of the present disclosure.

Throughout the description, similar reference numbers may be used to identify similar elements depicted in multiple embodiments. Although specific embodiments of the invention have been described and illustrated, the invention is not to be limited to the specific forms or arrangements of parts so described and illustrated. The scope of the invention is to be defined by the claims appended hereto and their equivalents.

DETAILED DESCRIPTION

Reference will now be made to exemplary embodiments illustrated in the drawings and specific language will be used herein to describe the same. It will nevertheless be understood that no limitation of the scope of the disclosure is thereby intended. Alterations and further modifications of the inventive features illustrated herein and additional applications of the principles of the inventions as illustrated herein, which would occur to one skilled in the relevant art and having possession of this disclosure, are to be considered within the scope of the invention.

FIG. 1 is a top perspective view of the dual phone case sleeve showing: cell phone cases attached referenced as A, double phone case holder referenced as B, and the display cut out CO, in accordance with an embodiment of the present disclosure.

Figure 2:
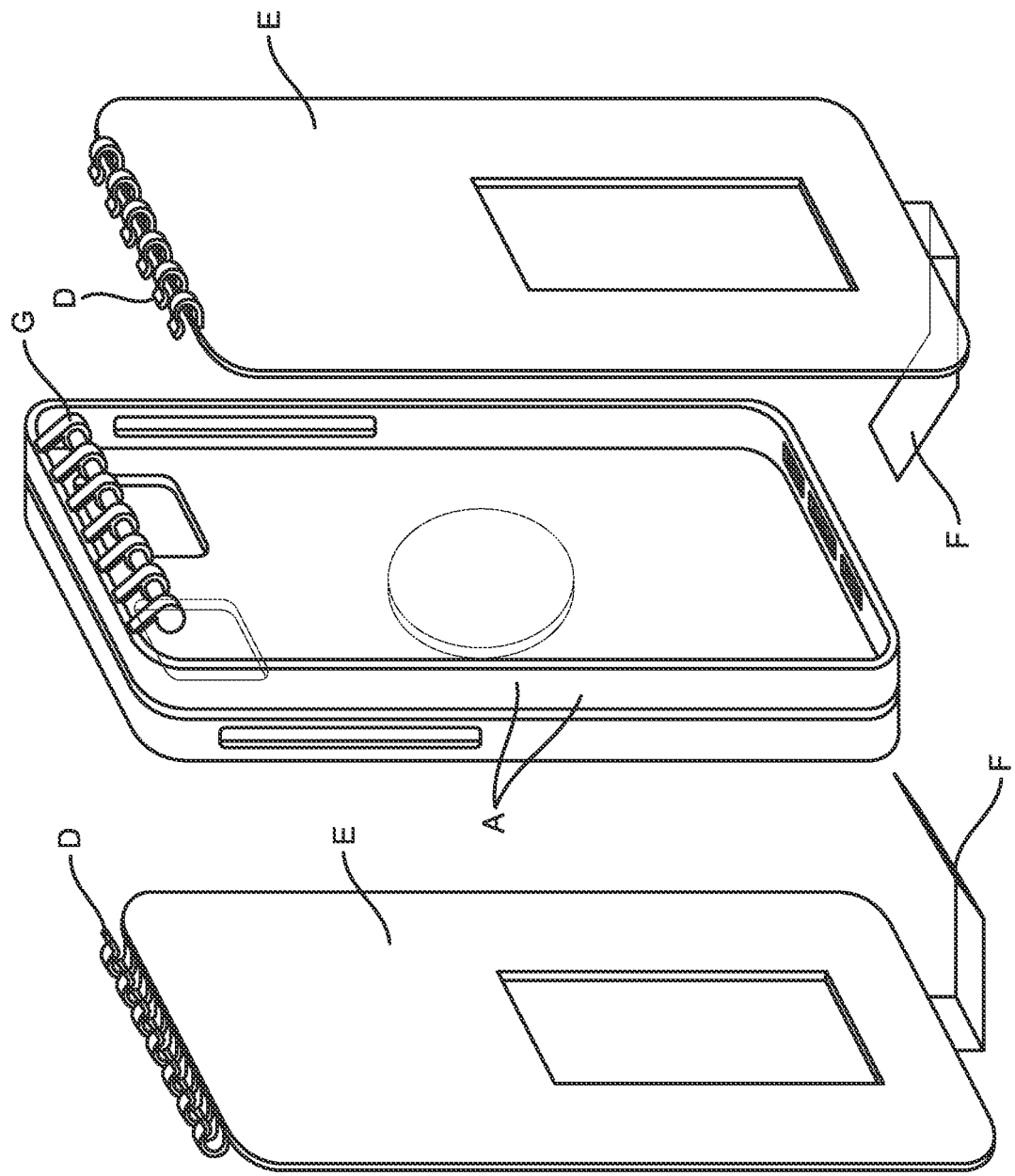
FIG. 2 is a top perspective view of the dual phone case clip on covers in accordance with an embodiment of the present disclosure.

FIG. 2 is a top perspective view of the dual phone case clip on covers showing: cell phone cases attached referenced as A, top clips referenced as D, clip-on cover referenced as E, bottom clip referenced as F, and top attachment on both sides referenced as G, in accordance with an embodiment of the present disclosure.

Figure 3:
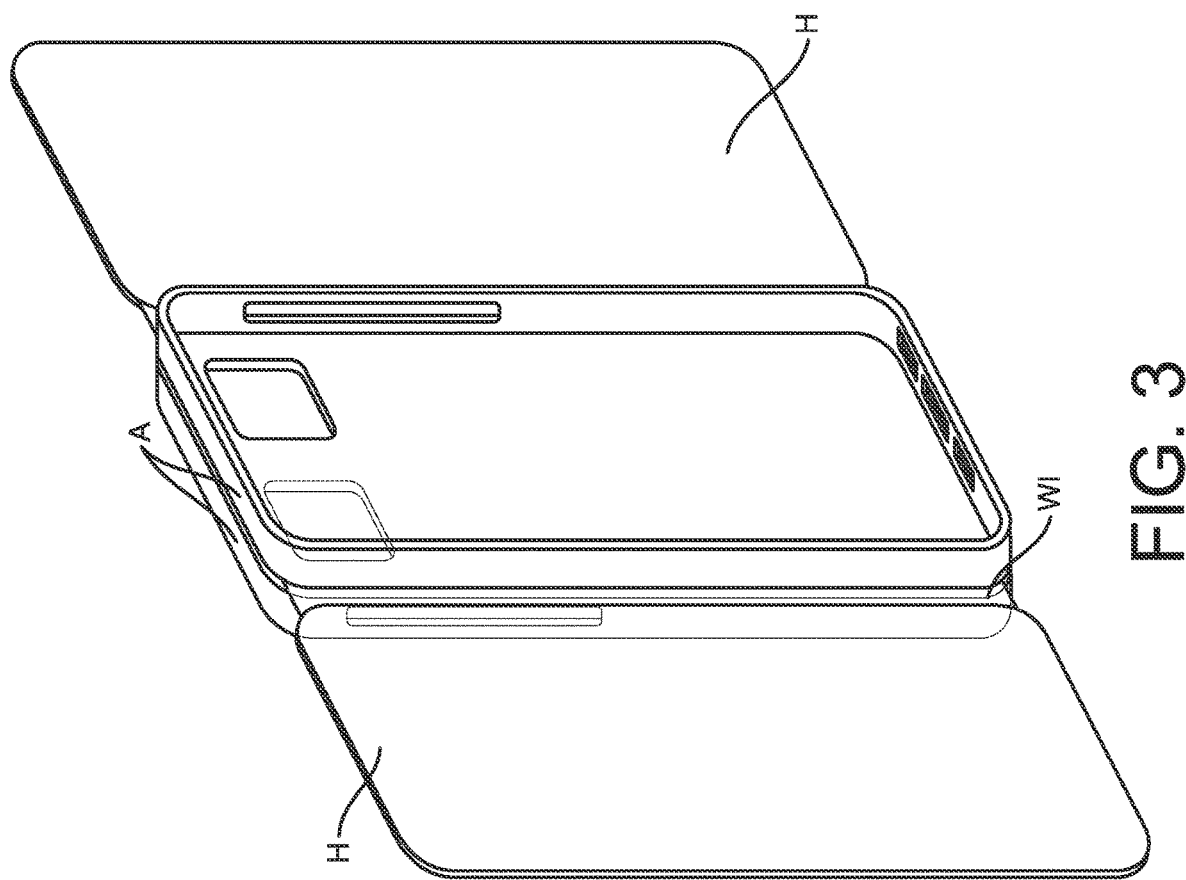
FIG. 3 is a top perspective view of the dual phone case folding cover in accordance with an embodiment of the present disclosure.

FIG. 3 is a top perspective view of the dual phone case folding cover showing: cell phone cases attached referenced as A, and folding cover referenced as H adjoined by webbing W1 which extends through and across the back sides of each of the two cell phone cases, in accordance with an embodiment of the present disclosure.

Figure 4:
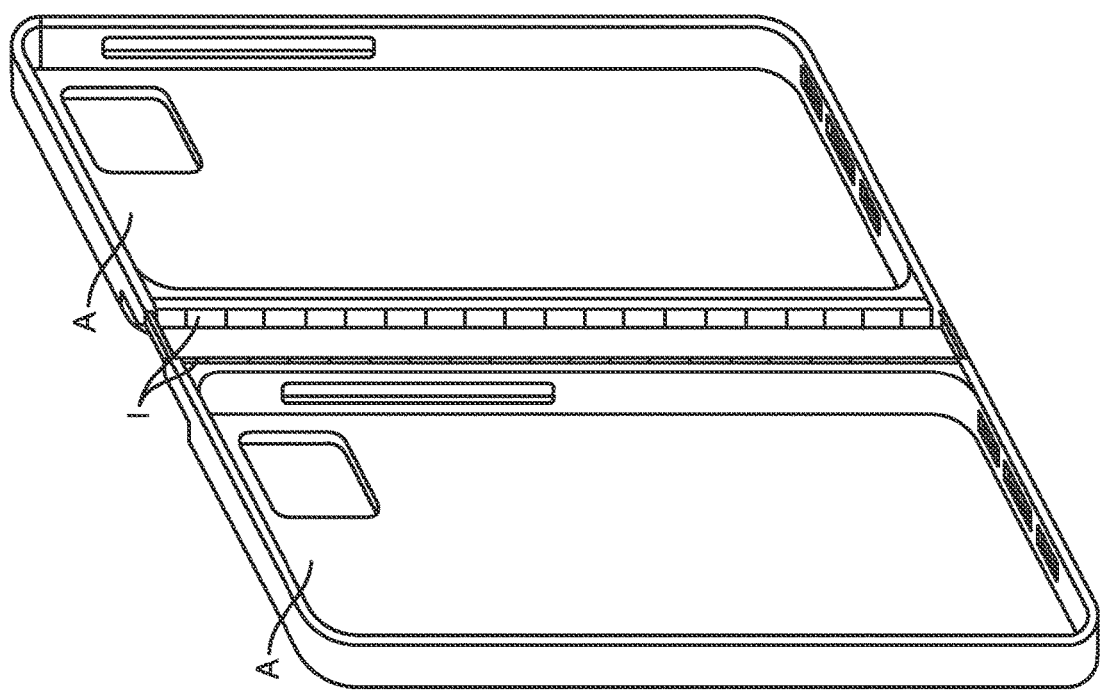
FIG. 4 is a top perspective view of the dual phone center hinge case in accordance with an embodiment of the present disclosure.

FIG. 4 is a top perspective view of the dual phone case center hinge showing: cell phone cases attached referenced as A, and hinges referenced as I, in accordance with an embodiment of the present disclosure.

The present disclosed dual phone case, also known as the "Dual Phone Case (w/wo Holster)" enables users to conveniently carry two phones in one case to effectively clean-up clutter, save space and reduce confusion regarding which phone is which and their overall location. Expanding on the initial design of an average phone case, the dual phone case (w/wo holster) introduces two novel cell phone cases that are attached back-to-back in a secure, well protected primary holding case. To further enhance functionality, the dual phone case (w/wo holster) comes with an optional holster that fits the belt loops, for easy wear. This innovative, top-quality product ensures a fully operational phone case that adequately protects the two phones held therein.

Figure 5:
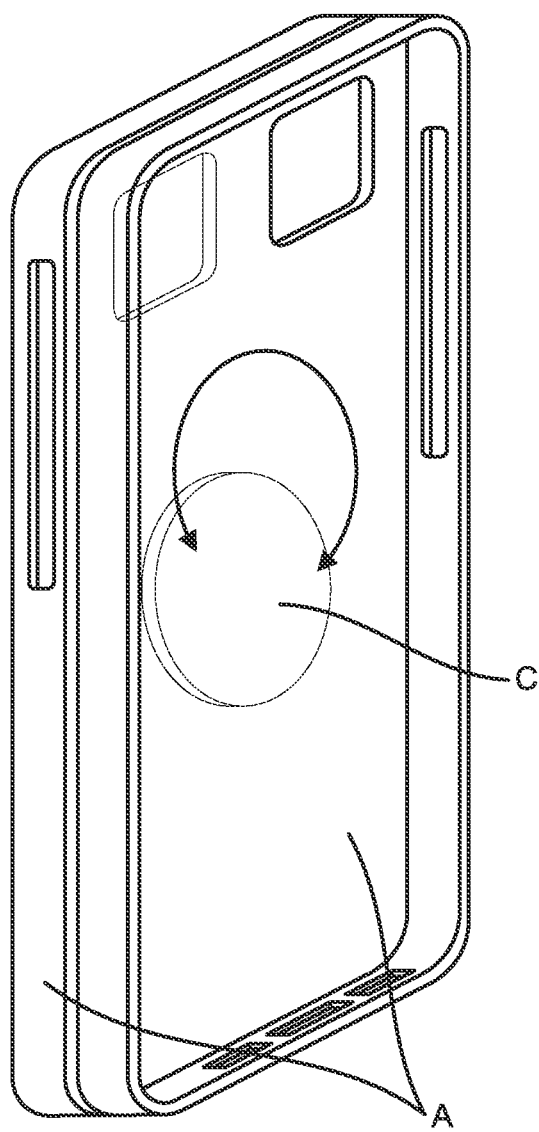
FIG. 5 is a top perspective view of the dual phone case back to back connector in accordance with an embodiment of the present disclosure.

FIG. 5 is a top perspective view of the dual phone case back to back connector in accordance with an embodiment of the present disclosure. The view includes the connector C which twists to lock the two cell phone covers back to back and allow viewing of respective front screens thereof.

Figure 6:
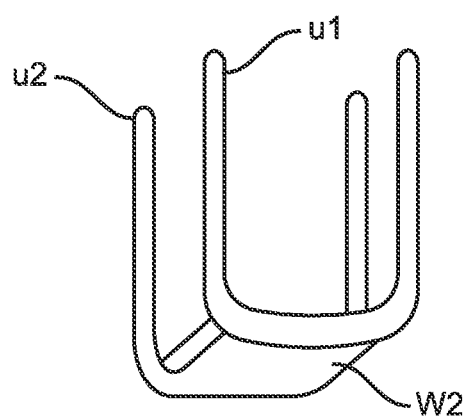
FIG. 6 is a side perspective view of the dual phone case double "U" clip in accordance with an embodiment of the present disclosure.

FIG. 6 is a side perspective view of the dual phone case double "U" clip in accordance with an embodiment of the present disclosure. Each of U1 and U2 are joined by a metallic webbing W2 which puts the two cell phone cases back to back in a mechanical compression yet allows viewing of the respective front screens.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

What is claimed is:

1. A phone case comprising:
    a first cell phone cover and a second cell phone cover comprising lateral sides and ends and configured to receive respective two cell phones on a back side of each; and
    a connector attached to a lateral side of each of the respective two cell phones via the first and the second cell phone covers, wherein the first cell phone cover, the second cell phone cover and the connector together comprise a sleeve configured to receive the two respective cell phones via an open top end and a closed bottom end between the lateral sides.

2. The phone case of claim 1, wherein the connector is configured to twist attach a back side of each of the two cell phones to each other.

3. The phone case of claim 1, further comprising a metal clip on front side cell phone cover for each of the two respective cell phones each configured to define an opening for viewing the front side of the respective two cell phones.

4. The phone case of claim 1, further comprising a folding front side cell phone cover for each of the two respective cell phones adjoined by a lateral side web from end to end.

5. The phone case of claim 1, further comprising a webbing configured to extend between the respective two cell phones along the lateral side from end to end and fold at both a left and a right lateral side thereof and cover a front side of each.

6. The phone case of claim 1, wherein the sleeve further comprises a notch in the lateral sides adjacent the open top end.

\* \* \* \* \*